United States Patent
Ylonen et al.

(10) Patent No.: US 8,280,866 B2
(45) Date of Patent: Oct. 2, 2012

(54) MONITORING WRITES USING THREAD-LOCAL WRITE BARRIER BUFFERS AND SOFT SYNCHRONIZATION

(75) Inventors: Tatu J. Ylonen, Espoo (FI); Tero T. Mononen, Espoo (FI)

(73) Assignee: Clausal Computing OY (FI)

( * ) Notice: Subject to any disclaimer, the term of this patent is extended or adjusted under 35 U.S.C. 154(b) by 99 days.

(21) Appl. No.: 12/774,136

(22) Filed: May 5, 2010

(65) Prior Publication Data

US 2011/0252075 A1   Oct. 13, 2011

Related U.S. Application Data

(63) Continuation-in-part of application No. 12/758,068, filed on Apr. 12, 2010.

(60) Provisional application No. 61/327,374, filed on Apr. 23, 2010.

(51) Int. Cl.
*G06F 17/30* (2006.01)

(52) U.S. Cl. .................. 707/695; 707/818

(58) Field of Classification Search .............. 707/695, 707/818

See application file for complete search history.

(56) References Cited

U.S. PATENT DOCUMENTS

| | | | |
|---|---|---|---|
| 6,671,707 B1 | 12/2003 | Hudson et al. | |
| 7,660,961 B2 * | 2/2010 | Printezis et al. | 711/165 |
| 7,747,659 B2 * | 6/2010 | Bacon et al. | 707/816 |
| 7,779,054 B1 * | 8/2010 | Printezis et al. | 707/813 |
| 7,937,419 B2 * | 5/2011 | Ylonen | 707/813 |
| 7,987,214 B2 * | 7/2011 | Ylonen | 707/813 |
| 7,996,446 B2 * | 8/2011 | Bacon et al. | 707/816 |
| 8,028,008 B2 * | 9/2011 | Kilner et al. | 707/813 |
| 8,065,349 B2 * | 11/2011 | Wright et al. | 707/818 |
| 8,078,302 B2 * | 12/2011 | Berreth | 700/94 |
| 2002/0107667 A1 | 8/2002 | Mathiske et al. | |
| 2003/0005027 A1 | 1/2003 | Borman et al. | |
| 2003/0236951 A1 | 12/2003 | Choi et al. | |
| 2004/0122874 A1 | 6/2004 | Garthwaite | |
| 2004/0122875 A1 | 6/2004 | Garthwaite | |
| 2004/0123065 A1 | 6/2004 | Garthwaite | |
| 2004/0186862 A1 | 9/2004 | Garthwaite | |
| 2006/0143421 A1 | 6/2006 | Subramoney | |
| 2008/0120624 A1 | 5/2008 | Borman et al. | |
| 2008/0281886 A1 | 11/2008 | Petrank et al. | |
| 2009/0222494 A1 | 9/2009 | Pizlo et al. | |
| 2009/0222634 A1 | 9/2009 | Pizlo et al. | |
| 2010/0082710 A1 | 4/2010 | Kilner et al. | |

OTHER PUBLICATIONS

Krishna M. Kavi et al, Shared Memory and Distributed Shared Memory Systems: A Survey, Advances in Computers, 2000, pp. 55-108, vol. 53, Academic Press, London, United Kingdom.

Adrian Moga and Michel Dubois, A comparative evaluation of hybrid distributed shared-memory systems, Journal of Systems Architecture, Jan. 2009, pp. 43-52, vol. 55 issue 1, Elsevier, Amsterdam, The Netherlands.

(Continued)

*Primary Examiner* — Kim Nguyen

(57) ABSTRACT

During garbage collection, writes to objects being copied (relocated) are monitored (tracked) using a write barrier that uses a thread-local write barrier buffer. In the preferred embodiment, soft synchronization is used for reading the thread-local write barrier buffers. In response to detecting a write to an object, the object may be re-copied, the copying may be made to fail, the write may be propagated to another copy of the object, or, e.g., another node in a distributed system may be notified of the write.

17 Claims, 6 Drawing Sheets

OTHER PUBLICATIONS

Filip Pizlo et al, A study of concurrent real-time garbage collectors, ACM SIGPLAN 2008 Conference on Programming Language Design and Implementation (PLDI '08), Jun. 2008, pp. 33-44, ACM, New York, USA.

Ioannis T. Schoinas, Fine-Grain Distributed Shared Memory on Clusters of Workstations, PhD Thesis, 1998, University of Wisconsin—Madison, USA.

Saleh E. Abdullahi and Graem A. Ringwood, Garbage Collecting the Internet: A Survey of Distributed Garbage Collection, ACM Computing Surveys, Sep. 1998, pp. 330-373, vol. 30 issue 3, ACM, New York, USA.

Ole Agesen, GC Points in a Threaded Environment, Technical report SMLI TR-98-70, 1998, Sun Microsystems Inc., Mountain View, California, USA.

Andrew W. Appel, Simple Generational Garbage Collection and Fast Allocation, Software—Practice and Experience, Feb. 1989, pp. 171-183, vol. 19 issue 2, John Wiley & Sons Inc., New York, USA.

Hezi Azatchi and Erez Petrank, Integrating Generations with Advanced Reference Counting Garbage Collectors, Compiler Construction (CC'03), 2003, pp. 185-199, Lecture Notes in Computer Science 2622, Springer, Berlin, Germany.

Stephen M. Blackburn and Kathryn S. McKinley, in or Out? Putting Write Barriers in Their Place, Proceedings of the 3rd International Symposium on Memory Management (ISMM'02), 2002, pp. 175-184, ACM, New York, USA.

Stephen M. Blackburn and Kathryn S. Mckinley, Ulterior Reference Counting: Fast Garbage Collection without a Long Wait, Proceedings of the 18th Conference on Object-Oriented Programming, Systems, Languages, and Applications (OOPSLA'03), 2003, pp. 344-358, ACM, New York, USA.

David Detlefs et al, Garbage-First Garbage Collection, Proceedings of the 4th International Symposium on Memory Management (ISMM'04), 2004, pp. 37-48, ACM, New York, USA.

Damien Doligez and Xavier Leroy, A concurrent, generational garbage collector for a multithreaded implementation of ML, Proceedings of the 20th ACM SIGPLAN-SIGACT Symposium on Principles of Programming Languages (POPL'93), 1993, pp. 113-123, ACM, New York, USA.

Paulo Ferreira and Marc Shapiro, Garbage Collection of Persistent Objects in Distributed Shared Memory, Proceedings of the 6th International Workshop on Persistent Object Systems (POS-6), 1994, pp. 184-199, ACM, New York, USA.

Shaoshan Liu et al, Packer: an Innovative Space-Time-Efficient Parallel Garbage Collection Algorithm Based on Virtual Spaces, 23rd IEEE International Symposium on Parallel and Distributed Processing (IPDPS 2009), 2009, IEEE Computer Society, Los Alamitos, California, USA.

Filip Pizlo et al, Stopless: A Real-Time Garbage Collector for Multiprocessors, Proceedings of the 6th International Symposium on Memory Management (ISMM'07), 2007, pp. 159-172, ACM, New York, USA.

Daniel J. Scales et al, Shasta: A Low Overhead Software-Only Approach for Supporting Fine-Grain Shared Memory, Proceedings of the 7th International Conference on Architectural Support for Programming Languages and Operating Systems (ASPLOS'96), 1996, pp. 174-185, ACM, New York, USA.

Luis Veiga and Paulo Ferreira, Asynchronous, Complete Distributed Garbage Collection, Technical report RT/11/2004, 2004 (updated 2005), INESC-ID/IST, Lisbon, Portugal.

Martin T. Vechev et al, Derivation and Evaluation of Concurrent Collectors, Proceedings of the 19th European Conference on Object-Oriented Programming (ECOOP 2005), 2005, pp. 577-601, Lecture Notes in Computer Science 3586, Springer, Berlin, Germany.

Stephen M. Blackburn and Antony L. Hosking, Barriers: Friend or Foe?, Proceedings of the 4th International Symposium on Memory Management (ISMM'04), 2004, pp. 143-151, ACM, New York, USA.

R. Hudson et al: Sapphire: Copying GC Without Stopping the World, Java Grande/ISCOPE 2001, pp. 48-57, ACM, 2001.

* cited by examiner

MONITORING WRITES USING THREAD-LOCAL WRITE BARRIER BUFFERS AND SOFT SYNCHRONIZATION

CROSS-REFERENCE TO RELATED APPLICATIONS

This application claims the benefit of prior-filed provisional application No. 61/327,374, filed Apr. 23, 2010, which is hereby incorporated herein by reference in its entirety.

This application is a continuation-in-part of the co-owned U.S. patent application Ser. No. 12/758,068, filed Apr. 12, 2010, titled "Thread-local hash table based write barrier buffers", which is hereby incorporated herein by reference in its entirety.

INCORPORATION-BY-REFERENCE OF MATERIAL SUBMITTED ON ATTACHED MEDIA

Not Applicable

TECHNICAL FIELD

The present invention relates to run-time environments for high-level programming languages, particularly garbage collection and distributed application execution environments.

BACKGROUND OF THE INVENTION

In various applications there is a need for a run-time support system to monitor which objects are modified by concurrently running mutators. Typically the run-time support system (such as a Java virtual machine) implements certain functionality, such as garbage collection or distributed shared memory, concurrently with mutator execution.

F. Pizlo et al: A study of Concurrent Real-Time Garbage Collectors, PLDI'08, pp. 33-44, ACM, 2008, which is hereby incorporated herein by reference, describes a number of garbage collectors where mutators execute concurrently with the garbage collection.

An important element of concurrent (copying/compacting) garbage collector implementations is copying (relocating) objects while mutators are executing.

US patent application publication 2008/0281886 A1 (Petrank et al), Nov. 13, 2008 "Concurrent, lock-free object copying" describes, among other things, a relocating mechanism that moves an object by using a status field related to a data field, possibly in an interim (wide) object space, which is then copied to a to-space object.

US 2009/0222494 A1 (Pizlo et al), Sep. 3, 2009 "Optimistic object relocation" describes, among other things, a technique wherein memory accesses are monitored for a write to an object [that is being relocated], and if a write is detected during relocation, the relocation fails and the memory at the destination address is deallocated; but if no write is detected, the relocation succeeds and the references are updated to point to the destination address. The aborted relocation may then be retried (to a newly allocated destination address).

US 2009/0222634 A1 (Pizlo et al), Sep. 3, 2009 "Probabilistic object relocation" describes, among other things, a method of relocating objects where the object relocation may mark the words of the object during relocation with a relocation value to indicate transfer to the destination memory without locking the threads. The threads may be configured to check the value in the source memory during object access, and to access the corresponding word of the destination memory if the source memory word comprises the relocation value.

The above patent application publications are hereby incorporated herein by reference.

Various copying mechanisms, such as the "Optimistic object relocation" mechanism referred to above, rely on monitoring objects being copied to detect when an object is written into, and to take some suitable action. The optimistic object relocation method, for example, may use atomic instructions (compare-and-swap) in the write barrier for setting a relocation status semaphore to indicate that copying should be aborted if the object is written into during copying.

However, using atomic instructions incurs a significant overhead on program execution, and therefore it would be desirable to avoid their use.

D. Detlefs et al: Garbage-First Garbage Collection, ISMM'04, p. 37-48, ACM, 2004, which is hereby incorporated herein by reference, describes a garbage collector that uses a card marking write barrier together with log buffers (for recording identities of dirty cards) and a background thread for scanning dirty cards and updating remembered sets.

Distributed shared memory implementations also monitor writes. There, monitoring is often performed at the granularity of a memory page or a cache line, using, e.g., memory protection or special hardware for implementing the monitoring. To implement fine-grained detection of writes, techniques such as computing a "diff" (difference) between an original and the modified page are used.

I. Schoinas: Fine-Grain Distributed Shared Memory on Clusters of Workstations, PhD Thesis, University of Wisconsin-Madison, 1998, which is hereby incorporated herein by reference, surveys various distributed shared memory systems, particularly those supporting fine-grained updates and presents its own solutions for such updates.

K. Kavi et al: Shared Memory and Distributed Shared Memory Systems: A Survey, Advances in Computers, vol. 53, pp. 55-108, Academic Press, 2000, which is hereby incorporated herein by reference, presents a survey of distributed shared memory implementations.

A. Moga and M. Dubois: A comparative evaluation of hybrid distributed shared-memory systems, Journal of Systems Architecture, 55:43-52, 2009, which is hereby incorporated herein by reference, presents a recent comparison of various systems for implementing distributed shared memory using the combination of software and special hardware for node-local operations.

It should be noted that the term write barrier is used in this disclosure in its garbage collection sense (roughly, a section of code or logic that intercepts writes and performs some bookkeeping actions in connection with a write), as opposed to its meaning in memory systems and processor architecture relating to memory ordering.

It would be desirable to monitor writes in distributed shared memory implementations more efficiently than is possible with the current methods for general-purpose computers. More efficient write monitoring would also benefit real-time garbage collectors, Java virtual machines, very large garbage collected systems (such as semantic search systems and knowledge processing systems), and generally future cluster computing systems where several nodes execute the same application.

BRIEF SUMMARY OF THE INVENTION

An objective of the invention is to provide an effective method for monitoring writes to a set of objects on general-purpose computers. Another objective is to facilitate obtaining the detected writes with little disruption to mutator execution.

A first aspect of the invention is a method of monitoring writes to a set of objects by one or more mutators, comprising:
   recording, by a write barrier executed by a mutator, at least one write by the mutator in a thread-local write barrier buffer associated with the mutator;
   obtaining recorded writes from the thread-local write barrier buffers associated with mutators; and
   processing the recorded writes.

A second aspect of the invention is a computing system comprising:
   at least one mutator associated with a write barrier buffer;
   at least one write barrier connected to the mutator and comprising a write recorder configured to record at least one write by the mutator in the write barrier buffer;
   a write obtainer connected to at least one GC point handler connected to the mutator; and
   at least one write processor connected to the write obtainer.

A third aspect of the invention is a tangible computer-readable medium comprising computer readable program code means embodied therein, operable to cause a computer to:
   record, using a write barrier executed by a mutator, at least one write by the mutator in a thread-local write barrier buffer associated with the mutator;
   obtain recorded writes from the thread-local write barrier buffers associated with mutators; and
   process the recorded writes.

Advantageously, the obtaining is performed using soft synchronization in each case.

Possible benefits of the invention in various embodiments include, but are not limited to (and not all embodiments necessarily enjoy from all or any of the mentioned benefits):
   eliminating race conditions and the need for using atomic instructions in the write barrier, and the need to iterate over all objects being monitored when reading monitoring results, which are needed when using a global write barrier buffer or when directly marking objects or changing their state from the write barrier(s)
   eliminating the need for extra bits or fields in object headers, thereby reducing memory consumption and allowing the rest of the system to be designed with fewer constraints
   moving more work away from the mutators (and write barrier) into a separate background thread that processes the writes, allowing multiple processor cores to be utilized more efficiently
   tracking using thread-local write barriers and soft synchronization scales nicely to distributed systems, whereas approaches based on marking objects directly from the write barrier are difficult to scale to distributed environments.

BRIEF DESCRIPTION OF THE SEVERAL VIEWS OF THE DRAWING(S)

Various exemplary embodiments (or families of embodiments) of the invention are illustrated in the accompanied drawings.

DETAILED DESCRIPTION OF THE INVENTION

Figure 1:
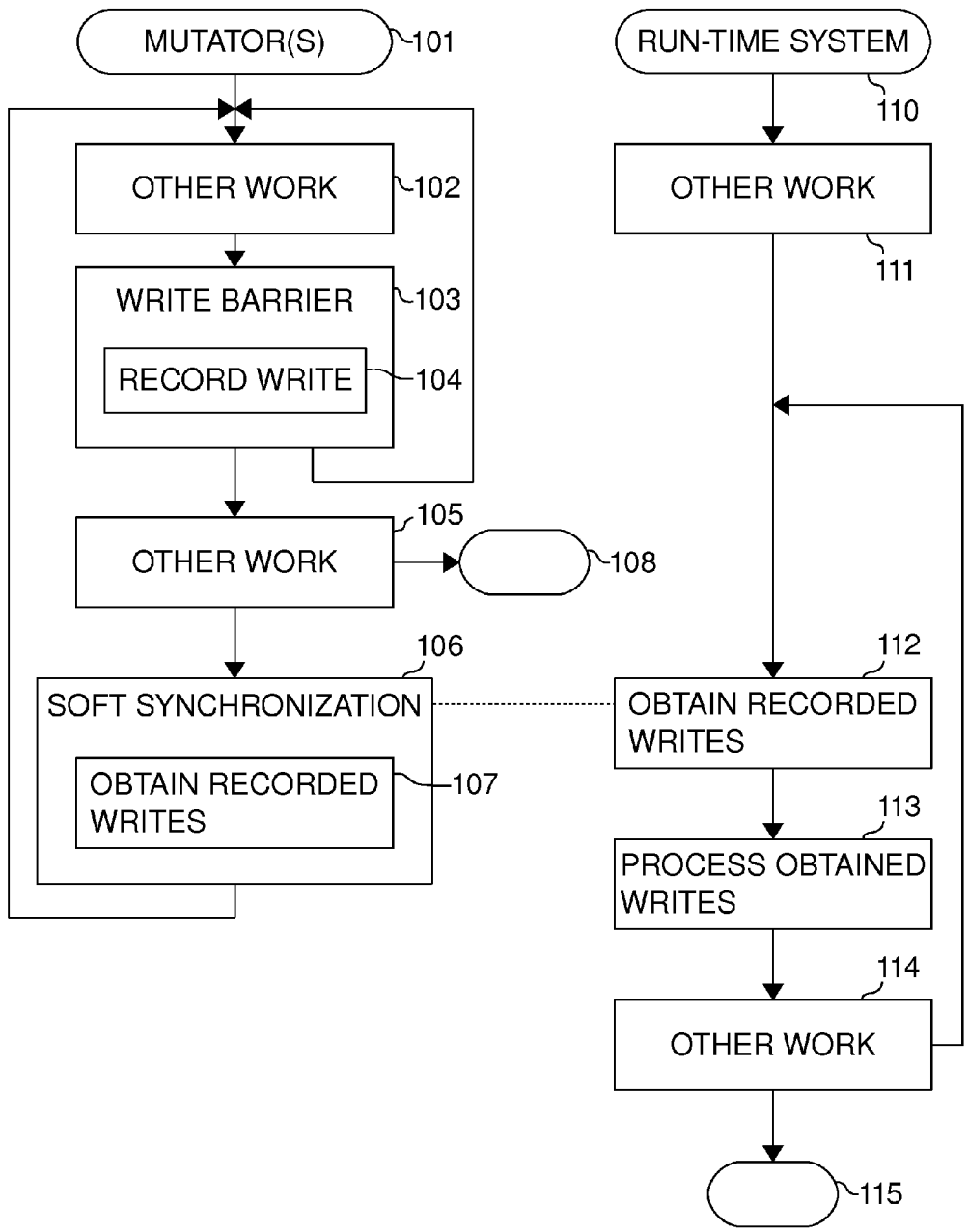
FIG. 1 illustrates tracking writes by mutators using a write barrier and obtaining the writes by a run-time system using soft synchronization.

FIG. 1 illustrates monitoring writes according to an embodiment of the invention. (101) illustrates a mutator thread (there would typically be a number of them in the same computing system), and (110) illustrates the run-time system (including garbage collection), which may be implemented using one or more threads running "in the background", concurrently with mutators. (102), (105), (111), and (114) illustrate other work performed in the respective processes (such as running normal application code, or performing garbage collection actions). (108) and (115) illustrate termination of a mutator and a run-time process, respectively. A process is used here to refer to some relatively independent unit or type of work, and may be performed using one or more threads and/or special hardware processing units. In this disclosure, the word process does not imply that different processes would necessarily run in a separate address space.

(103) illustrates a write barrier (an application may comprise many instances of a write barrier, or many instances of a write barrier fast path component and one or a few instances of a write barrier slow path component). The write barrier is illustrated in more detail in FIG. 2. (104) illustrates recording a write in a write barrier slow path.

(106) illustrates a soft synchronization operation performed by a mutator. In soft synchronization, all mutators perform a certain operation, but not necessarily simultaneously (i.e., mutators are not all required to stop simultaneously). Soft synchronization can be advantageously implemented by setting a flag in each mutator thread context, and having the mutators test the flag at each GC point (i.e., at each position in the application's code or logic where garbage collection is allowed). When the flag is set, the GC point performs or calls a suitable function (which may vary depending on the purpose of the soft synchronization). Each thread will participate in a soft synchronization, but they will not necessarily perform it simultaneously. After soft synchronization, each mutator continues executing the application.

Soft synchronization for threads in blocking calls may be performed by any available thread (including a background thread that is part of the run-time system) as follows. First, the thread in a blocking call ("blocked thread") is prevented from continuing from the blocking call. Then, the other thread calls the synchronization function on its behalf. Finally, the blocked thread is again permitted to continue from the blocking call. In effect, if the blocked thread tries to return before the synchronization call is complete, it will stop and wait until the call is complete.

Figure 3:
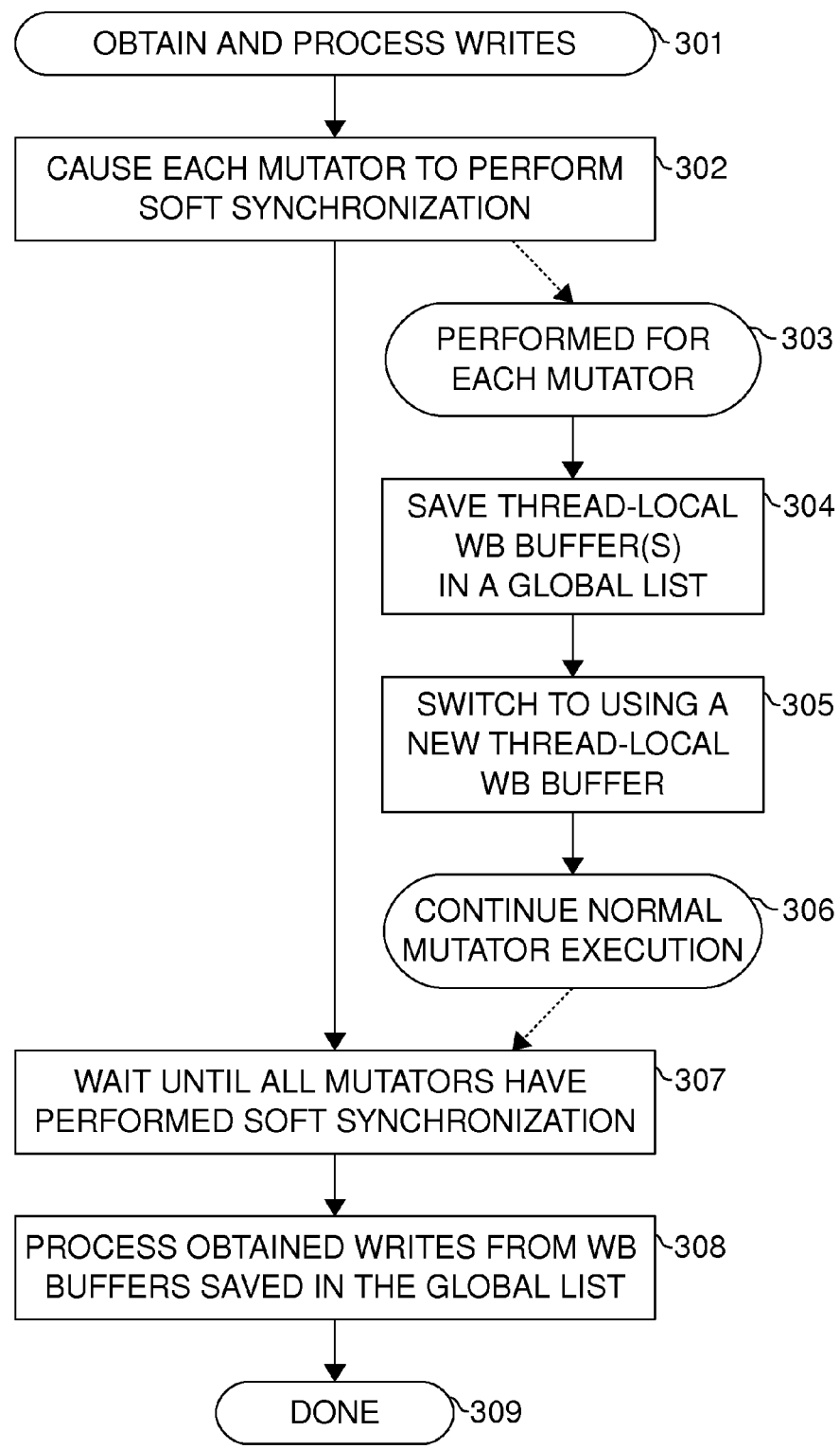
FIG. 3 illustrates obtaining and processing writes.
Figure 4:
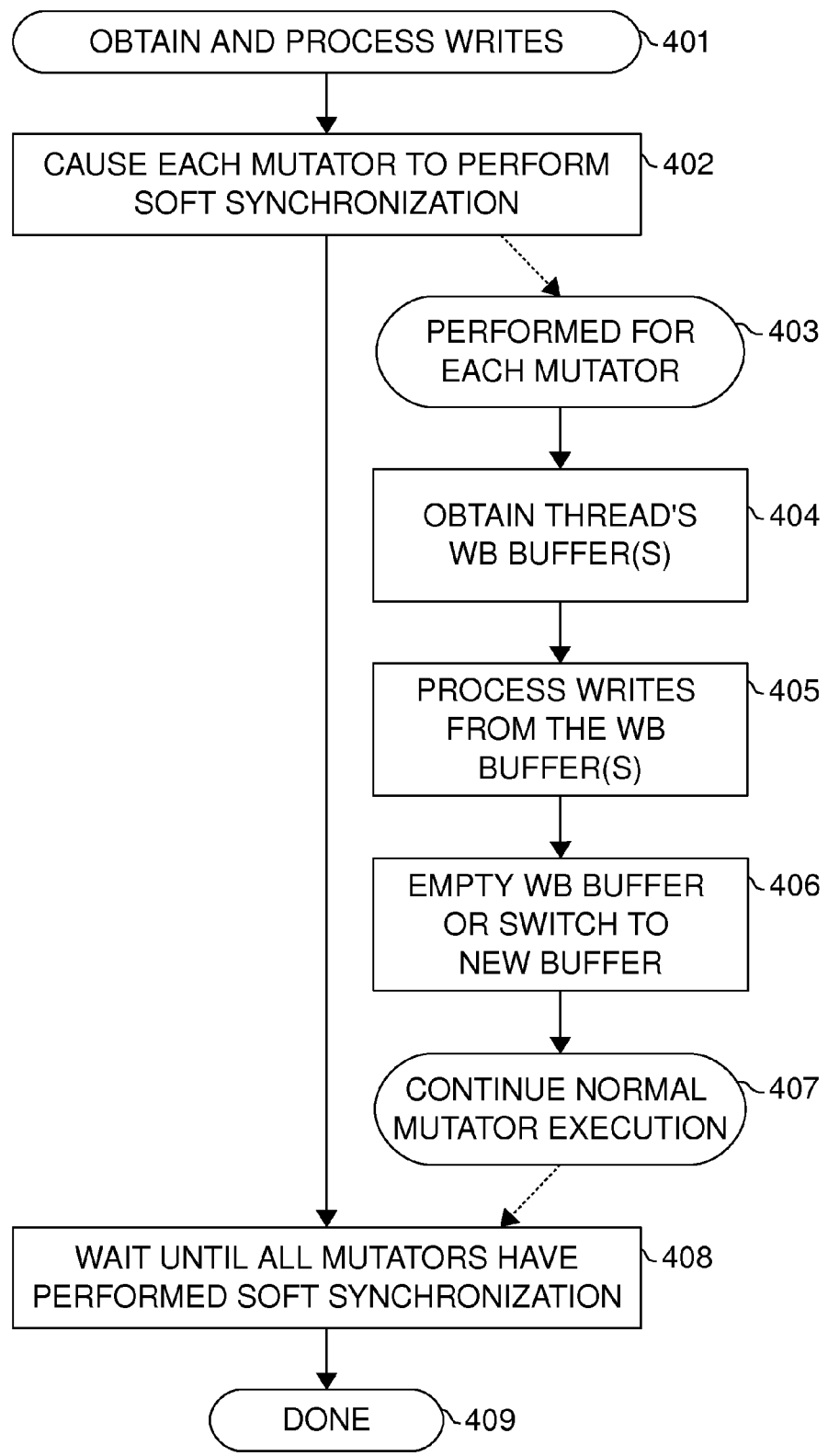
FIG. 4 illustrates obtaining and processing writes in an alternative embodiment.

(107) illustrates a function performed in the soft synchronization, in this case obtaining the recorded writes. FIG. 3 illustrates obtaining the writes in an embodiment that only moves aside (to a global list) the thread-local write barrier buffers from the mutator performing the synchronization (and as it is done for all mutators, the writes will be obtained from all mutators). A background process (the run-time system) then processes writes from the buffers. FIG. 4 illustrates a different embodiment, where processing the writes is done directly by each mutator thread (in this embodiment, step (113) could be missing from the background process as it would be performed by the mutators).

(112) illustrates the run-time system (e.g., garbage collector or distributed shared memory implementation) obtaining the recorded writes from all mutators. Step (113) illustrates processing the obtained writes one-by-one or fully or partially in parallel.

Figure 2:
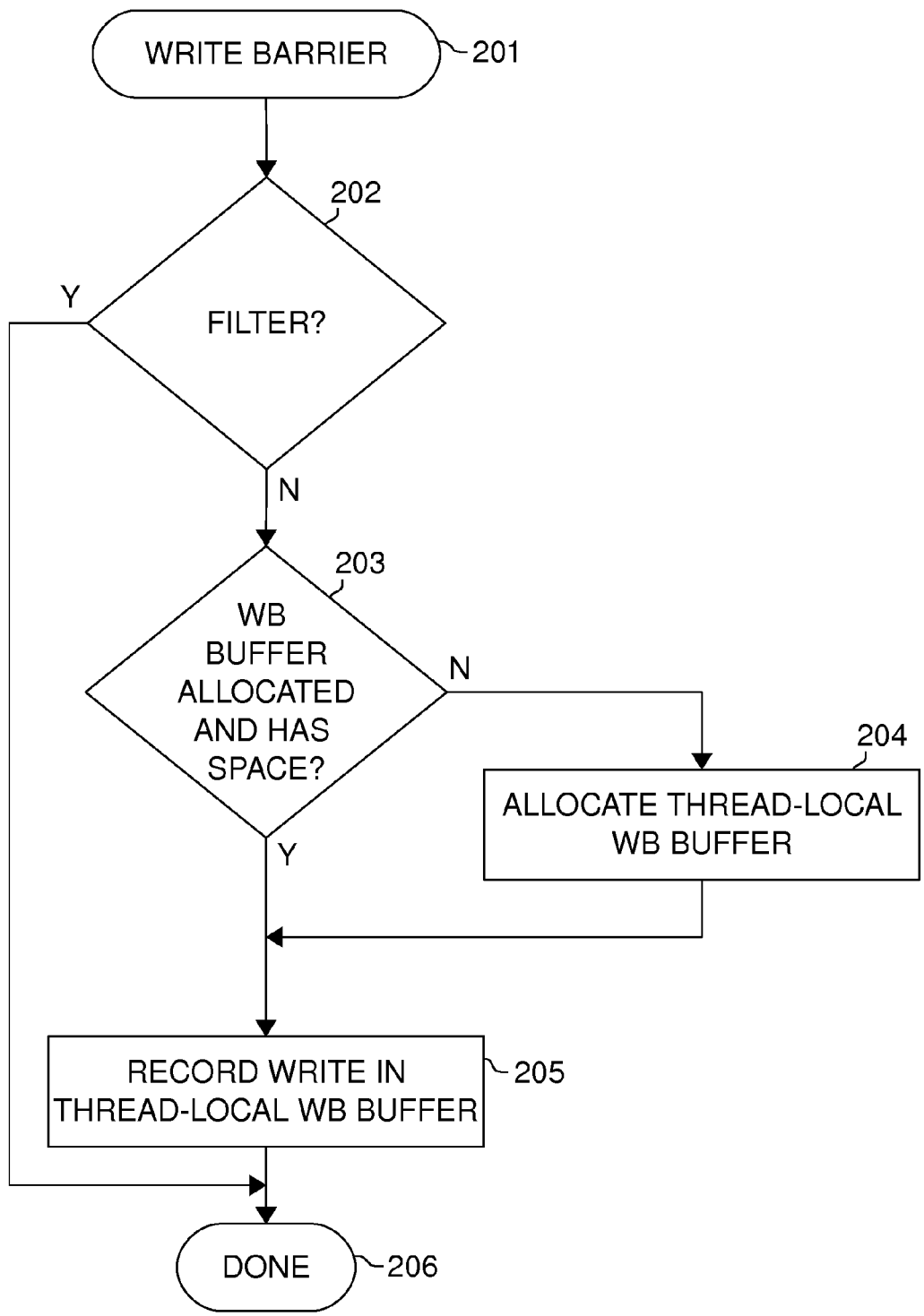
FIG. 2 illustrates the implementation of the write barrier.

FIG. 2 illustrates the operation of a write barrier in an embodiment of the invention. (201) illustrates entry to the write barrier. (202) illustrates a filtering test that determines whether the particular write should be recorded or not. If the write is filtered out, it will not be recorded. It is advantageous for performance to record as few writes as possible, but some writes must be recorded for correctness. The filtering criteria may be different at different phases of the operation of the system; for example, recording writes for monitoring written objects might only take place during parts of a garbage collection cycle in some embodiments.

Any known method for filtering writes in a write barrier may be used for determining whether the written object is a monitored object. In many embodiments, the monitored objects are selected at region granularity (i.e., either all or no objects are selected from a particular region), and comparisons of the address of the object are used for determining whether it is in a region being monitored. Alternatively, a bit vector could be indexed by a region number computed from the address of the object, and the corresponding bit would indicate whether the region is monitored. A region status array could also be used similarly, with at least one status indicating a monitored region. It would also be possible to reserve a bit or a status field in object headers for indicating that the object is monitored, and read and test this field whenever a write to the object occurs.

(203) tests whether a thread-local write barrier buffer has already been allocated for the mutator executing the write barrier, and whether there is still space in the current buffer. The write barrier buffers are advantageously fixed-size data structures, such as log buffers (essentially array plus next pointer) or hash tables (see U.S. patent application Ser. No. 12/758,068 "Thread-local hash table based write barrier buffers"). If a write barrier buffer becomes too full, a new buffer is advantageously allocated and the old one is chained to it (e.g., using a linked list). (204) illustrates allocating a new write barrier buffer.

(205) illustrates recording a write in the thread-local write barrier buffer. Depending on the embodiment, it may record, e.g., a pointer to the written object, the written address directly (possibly together with the size of the write), or an object pointer plus an offset or field identifier. It may also record the old and/or the new value of the written memory location in some embodiments.

The recording would typically be done in a write barrier slow path (at least part of the filtering would typically be done in the fast path, and the fast path would call the slow path function if the write was not filtered out by the fast path).

For a log-based write barrier buffer, the recording would store, e.g., the written address in the array associated with the buffer, and would increment the next pointer/index. For a hash table based write barrier buffer, the written address (or whatever is recorded) would typically be used as the key to the hash table. Multiplicative hash tables with linear probing can be extremely fast (faster than uncached memory accesses that are frequently incurred in, e.g., card marking).

(206) illustrates the end of the write barrier (and/or returning from the slow path).

FIG. 3 illustrates obtaining and processing writes in an advantageous embodiment using soft synchronization to read the thread-local write barrier buffers from mutators. (301) illustrates the beginning of the operation and (309) its end;

typically (301), (302), (307), (308), and (309) would be performed by a run-time background process, whereas (303) to (306) would be performed by each mutator (or on behalf of mutators in blocking calls, by an arbitrary thread).

(302) illustrates causing each mutator to perform soft synchronization, executing (303) to (306) as the soft synchronization function (rather than a function, it could also be dispatched in some other way, such as using a "switch" or "case" statement). Performing soft synchronization could involve setting a flag in a thread-specific context object for each mutator, causing each mutator to call the soft synchronization function at (303). For those threads in blocking calls, step (302) could execute (303) to (306) directly, setting a flag in them that prevents them from resuming execution after returning from the blocking call, causing them to wait on a condition variable (as in POSIX threads) if they do return, and clearing the flag and signaling the condition variable after reaching (306).

(303) is entered from soft synchronization. (304) saves the thread-local write barrier buffer(s) from the mutator in a global list, and (305) switches to using a new thread-local write barrier buffer. (306) continues execution. The following pseudo-code illustrates how these could be implemented:

pthread_mutex_lock(&global_list_lock);
  list_insert_head(&global_list, thread.wb_buffer);
  pthread_mutex_unlock(&global_list_lock);
  thread.wb_buffer=allocate_empty_wb_buffer( );

(307) illustrates waiting until all mutators have performed soft synchronization. Typically a counter would be used for counting the number of threads that have not yet completed their synchronization, and a condition variable would be used for waiting for completion, as illustrated in the following pseudo-code for (302) and (307).

```
pthread_mutex_lock(&thread_status_lock);
wait_count = 0;
for (thr : all_threads)
    {
        if (thr in blocking call)
            {
                thr.dont_return = TRUE;
                call_sync_function(thr);
                thr.dont_return = FALSE;
                pthread_cond_broadcast(&thread_return_cond);
            }
        else
            {
                thr.sync_pending = TRUE;
                wait_count++;
            }
    }
while (wait_count > 0)
    pthread_cond_wait(&thread_status_cond,
                      &thread_status_lock);
pthread_mutex_lock(&thread_status_lock);
```

Each mutator thread could have code similar to the following in its GC point implementation:

```
if (thread_self.sync_pending)
    {
        call_sync_function(thread_self);
        thread_self.sync_pending = FALSE;
        pthread_mutex_lock(&thread_status_lock);
        wait_count--;
        if (wait_count == 0)
            pthread_cond_signal(&thread_status_cond);
        pthread_mutex_unlock(&thread_status_lock);
    }
```

(308) illustrates processing obtained writes from the write barrier buffers saved in the global list. At this point no mutator is modifying the global list or any of the buffers on the list, so it can be processed without locking or other synchronization. It could be similar to the following:

```
for (buffer : global_list)
    {
        for (i = 0; i < buffer.size; i++)
            if (buffer.array[i] != 0)
                process_write(buffer.array[i]);
    }
```

The actual write of a new value to the written memory location may take place after the write barrier (e.g., at (206)), or if the old value is not saved in (205) or is read before the write, before the write barrier (e.g., at (201)).

FIG. 4 illustrates an alternative embodiment of obtaining and processing writes, where processing the writes is performed during soft synchronization. A drawback of this embodiment is that the soft synchronization may take longer, and if processing a write modifies global data structures, it may require its own synchronization mechanisms (e.g., locks or atomic instructions). However, in cases where no such synchronization is needed, this embodiment automatically parallelizes the processing of writes using the mutator threads.

(401) illustrates the beginning of the operation. (402) illustrates causing each mutator to perform soft synchronization. (403) illustrates the beginning of the code executed by each mutator (or on behalf of mutators in blocked calls), (404) obtaining the write barrier buffer(s) (in this case from just the current thread), (405) processing the writes in the buffer(s), (406) emptying the write barrier buffer(s) or allocating a new one (the emptying could be combined with processing the write by clearing each array slot after processing it), and (407) continues normal mutator execution.

(408) waits until all mutators have performed soft synchronization (or it has been performed on their behalf), and (409) completes the operation.

A further alternative would be to use a full stop (i.e., stopping all mutator threads simultaneously) for obtaining the write barrier buffers and/or processing the writes. It is, however, generally desirable to avoid such stops in real-time systems.

Figure 5:
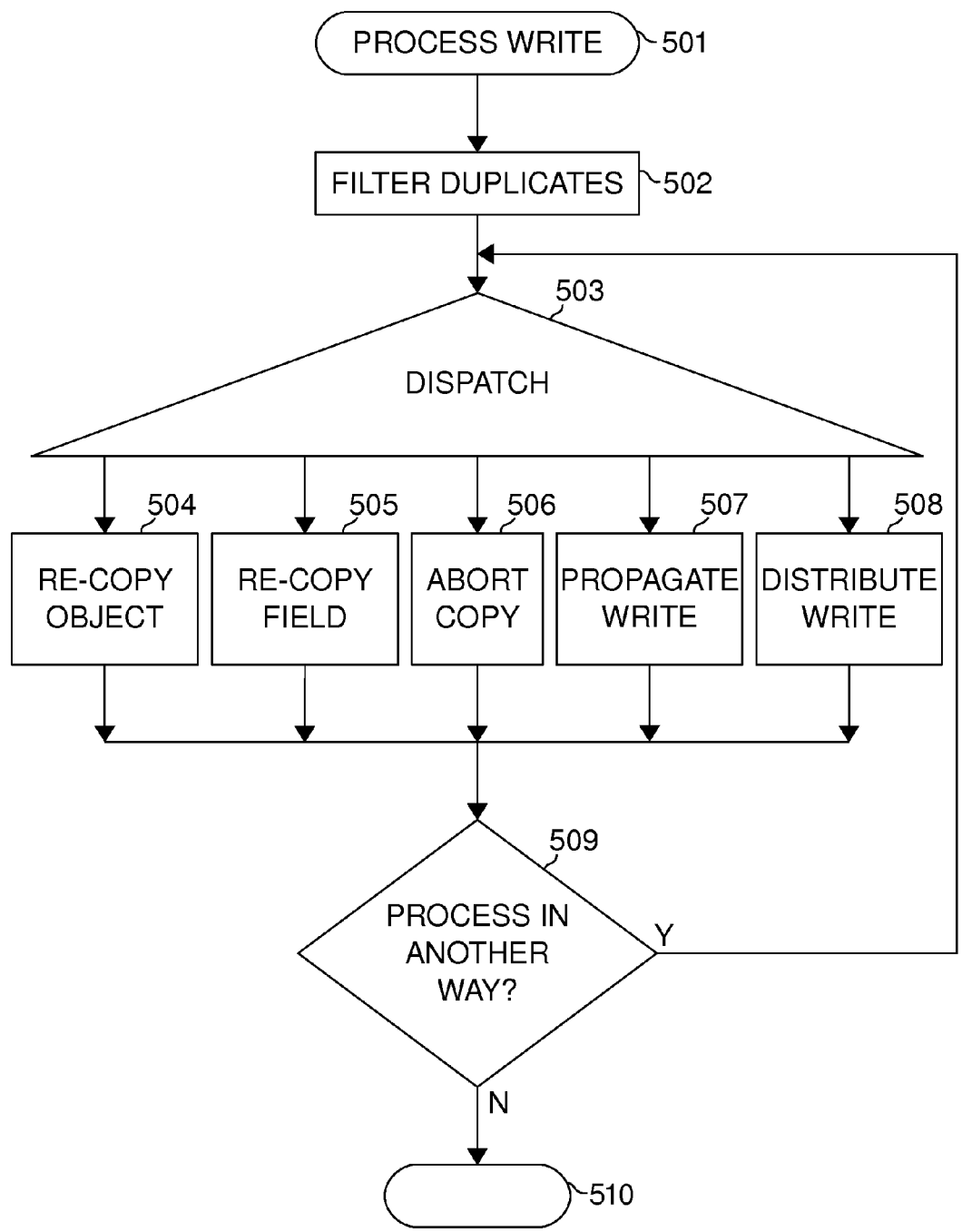
FIG. 5 illustrates processing a write for various purposes.

FIG. 5 illustrates processing a write in an embodiment of the invention. (501) is the beginning of the operation.

(502) illustrates filtering duplicates. Since the write barrier buffers are thread-local, it is possible that two mutators have written to the same memory location, and thus the same address could occur more than once on the global list of obtained write barrier buffers. Also, in some embodiments mutators could have more than one write barrier buffer, with some addresses on more than one of their buffers (e.g., if they switched to a new buffer when the previous one became too full). Performing this as a separate step is completely optional; the individual operations (illustrated by (504) to (508)) could also be tolerant to being invoked for the same written address (or object) more than once. If duplicates are to be eliminated, one way is to have a hash table where all already processed addresses are stored, make a lookup from the hash table, and if the address is found, not process it again (essentially jumping to (510)), and otherwise add it to the hash table.

(503) illustrates dispatching to the desired operation in each case. In some embodiments, more than one operation might be used (e.g., if the embodiment needs to monitor writes both to trigger re-copying and to distribute writes to other nodes in a distributed system). The set of operations here is only illustrative and varies from embodiment to embodiment. The dispatch might be implemented as a "switch" or "case" statement, function pointer, or in some other convenient way (or not at all, if there is only one possible operation in the embodiment).

(504) illustrates triggering the re-copying of an object (e.g., in a concurrent garbage collector that uses re-copying entire objects), as described in the U.S. patent application Ser. No. 12/772,496 "Object copying with re-copying concurrently written objects", which is hereby incorporated herein by reference. This operation could, for example, add a pointer to the object in a hash table specifying the set of objects to be re-copied (in effect, triggering it to be re-copied when the set is processed).

(505) illustrates triggering the re-copying of the written field(s) of an object (e.g., in a concurrent garbage collector that uses re-copying just the written fields of an object), as described in the U.S. patent application Ser. No. 12/772,496. This operation could, for example, add a pointer to the object and an offset or identifier for the field in a hash table (both used jointly as the key) specifying the set of memory locations to be re-copied (in effect, triggering it to be re-copied when the set is processed).

(506) illustrates aborting the copying of an object, deallocating the destination address allocated for it, and causing copying it to fail, as described in the US patent application publication 2009/0222494.

(507) illustrates propagating the write to the other copy of the written object (either from the original to the new copy, or from the new copy back to the original copy), as described in the U.S. patent application Ser. No. 12/772,496.

(508) illustrates causing an update to be propagated to other nodes in a distributed system for implementing fine-grain distributed shared memory. In this case, exact information about the written memory locations will be available to the shared memory implementation, and it is unnecessary to compute a "diff" between an original and a modified version of a page (or even to retain an original). Rather, this operation could mark the modified words (or bytes), or add them to a per-page, per-region, or global list, hash table, or other set. When sending an update to other nodes in the distributed system, those words or bytes that have been written could then be determined from the data structure (the write size would preferably also be saved and used to determine the exact size to send in such embodiments). Various methods and protocols for sending such updates are known in the art and described in, e.g., Schoinas (1998).

(509) illustrates testing if other operations should also be performed on the write. (510) illustrates the end of the processing of a write.

Figure 6:
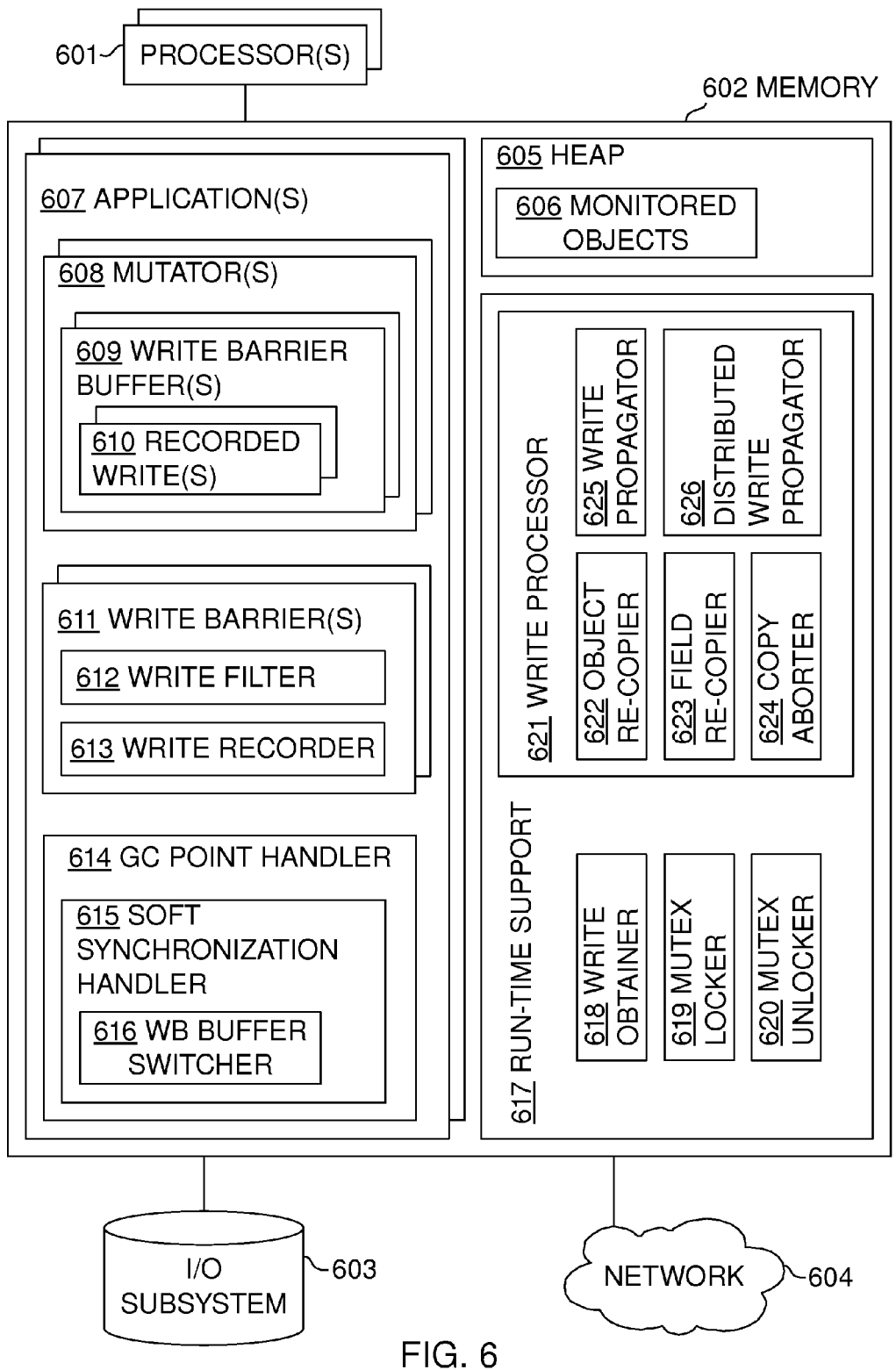
FIG. 6 illustrates an advantageous computing system embodiment of the invention.

FIG. 6 illustrates a computing system which is an embodiment of the invention. The computing system comprises one or more processors (601) attached to a memory (602), either directly or indirectly, using a suitable bus architecture as is known in the art. The system also comprises an I/O subsystem (603), which often comprises non-volatile storage (such as disks, tapes, solid state disks, or other memories) and user interaction devices (such as a display, keyboard, mouse, touchpad or touchscreen, speaker, microphone, camera, acceleration sensors, etc). It often also comprises one or more network interfaces or an entire network (604) used to connect to other computers, the Internet, and/or to other nodes in a distributed computing system. Any network or interconnection technologies may be used, such as wireless communications technologies, optical networks, ethernet, and/or InfiniBand®.

The heap (605) is a memory area used for storing objects that can be accessed (i.e., read and/or written) by mutators. Global variables can also be considered part of the heap. One or more of the objects may be monitored objects (606). Writes to the monitored objects are monitored.

A mutator (608) is a thread (or other suitable abstraction) executing application (607) logic, and usually writing to (i.e., mutating) objects in the heap. Mutators may be implemented, e.g., as operating system threads time-shared on the processor(s), as dedicated processor cores, or as hardware or software state machines (possibly with stack). They may also employ emulation, just-in-time compilation, or an interpreter (as in, e.g., many Java virtual machines).

Mutators use write barrier(s) (611) for performing certain actions in connection with writes to the heap. At least one of the write barrier(s) comprises a write filter (612) for filtering out some of the writes, and a write recorder (613) for recording those writes that were not filtered out. The writes are recorded in one or more thread-local write barrier buffer(s) (609) in each mutator. At least some of the write barrier buffers comprise one or more recorded writes (610).

Some points in a mutator's execution are GC points, where execution may branch to a GC point handler (614), which may interrupt the mutator for garbage collection or other operations requested by the run-time system. A GC point is a point (in the application's executable code usually) where the mutator's execution may be interrupted for garbage collection related actions. In some embodiments all instructions are possible GC points; in others, garbage collection can only occur at specific points (where, e.g., specific instructions may be emitted by the compiler to test whether a garbage collection related action should be performed, and if so, perform it). GC points are known in the art and described in, e.g., O. Agesen: GC Points in a Threaded Environment, Technical report SMLI TR-98-70, Sun Microsystems Inc., 1998, which is hereby incorporated herein by reference.

One or more GC point handlers may comprise a soft synchronization handler (615) with logic for saving the mutator's thread-local write barrier buffers in a global list or other suitable data structure and switching to an empty buffer (616).

(617) illustrates a run-time support system in the computing system. Such a run-time support system may include, e.g., a garbage collector and/or a distributed shared memory implementation.

The various components of the run-time support system include a write obtainer (618) for obtaining write barrier buffers from mutators, a mutex locker (619) for obtaining a lock on a mutex, a mutex unlocker (620) for releasing a mutex, and a write processor (621) for processing detected writes to monitored objects. The write processor comprises one or more write handling components for implementing operations on the detected writes. An object re-copier (622) can be used for re-copying an entire object; a field re-copier (623) can be used for re-copying just the modified field(s) of an object, a copy aborter (624) can be used for aborting the copying of an object, a write propagator (625) can be used for propagating a write to an object to the new copy and/or vice versa, and a distributed write propagator (626) can be used for implementing fine-grain synchronization in distributed shared memory.

The processors may be individual physical processors, co-processors, specialized state machines, or processing cores within a single chip, module, ASIC, or system-on-a-chip. Preferably they are 64-bit general purpose processors, such as Intel® Xeon® X7560 or AMD® 6176SE, or more precisely cores therein. The memory in present day computers is typically semiconductor DRAM (e.g., DDR3 DIMMs), but other technologies may also be used (including non-volatile memory technologies such as memristors).

A computer may be any general or special purpose computer, workstation, server, laptop, handheld device, smartphone, wearable computer, embedded computer, microchip, or other similar apparatus capable of performing data processing.

A computing system may be a computer, a cluster of computers (possibly comprising many racks or machine rooms of computing nodes and possibly utilizing distributed shared memory), a computing grid, a distributed computer, or an apparatus that performs data processing (e.g., robot, vehicle, vessel, industrial machine, control system, instrument, game, toy, home appliance, or office appliance). It may also be an OEM component or module, such as a natural language interface for a larger system. The functionality described herein might be divided among several such modules.

A computing system may comprise various additional components that a skilled person would know belonging to an apparatus or system for a particular purpose or application in each case. Examples possible additional components include sensors, cameras, radar, ultrasound sensors, manipulators, wheels, hands, legs, wings, rotors, joints, motors, engines, conveyors, control systems, drive trains, propulsion systems, enclosures, support structures, hulls, fuselages, power sources, batteries, light sources, instrument panels, graphics processors, front-end computers, tuners, radios, infrared interfaces, remote controls, circuit boards, connectors, cabling, etc. Various examples illustrating the components that typically go in each kind of apparatus can be found in US patents as well as in the open technical literature in the related fields, and are generally known to one skilled in the art or easily found out from public sources. The invention can generally lead to improved user interfaces, more attractive interaction, better control systems, more intelligence, and improved competitiveness in a broad variety of apparatuses and systems, without requiring substantial changes in components other than the higher-level control/interface systems that perform data processing.

Various components relevant to one or more embodiments of the present invention that are illustrated in the figures may be implemented as computer executable program code means residing in tangible computer-readable memory or medium, or fully or partly in hardware, for example, as a part of a processor, as a co-processor, or as additional components or logic circuitry in an ASIC or a system-on-a-chip. They may also be implemented using, e.g., emulation, interpretation, just-in-time compilation, or a virtual machine.

Many variations of the above described embodiments will be available to one skilled in the art. In particular, some operations could be reordered, combined, or interleaved, or executed in parallel, and many of the data structures could be implemented differently. When one element, step, or object is specified, in many cases several elements, steps, or objects could equivalently occur. Steps in flowcharts could be implemented, e.g., as state machine states, logic circuits, or optics in hardware components, as instructions, subprograms, or processes executed by a processor, or a combination of these and other techniques.

It is to be understood that the aspects and embodiments of the invention described in this specification may be used in any combination with each other. Several of the aspects and embodiments may be combined together to form a further embodiment of the invention, and not all features, elements, or characteristics of an embodiment necessarily appear in other embodiments. A method, an apparatus, or a computer program product which is an aspect of the invention may comprise any number of the embodiments or elements of the invention described in this specification. Separate references to "an embodiment" or "one embodiment" refer to particular embodiments or classes of embodiments (possibly different embodiments in each case), not necessarily all possible embodiments of the invention. The subject matter described herein is provided by way of illustration only and should not be construed as limiting.

A pointer should be interpreted to mean any reference to an object, such as a memory address, an index into an array of objects, a key into a (possibly weak) hash table containing objects, a global unique identifier, or some other object identifier that can be used to retrieve and/or gain access to the referenced object. In some embodiments pointers may also refer to fields of a larger object.

In this specification, selecting has its ordinary meaning, with the understanding that selecting from just one alternative means taking that alternative (i.e., the only possible choice), and selecting from no alternatives either returns a "no selection" indicator (such as a NULL pointer), triggers an error (e.g., a "throw" in Lisp or "exception" in Java), or returns a default value, as is appropriate in each embodiment.

Computer-readable media can include, e.g., computer-readable magnetic data storage media (e.g., floppies, disk drives, tapes), computer-readable optical data storage media (e.g., disks, tapes, holograms, crystals, strips), semiconductor memories (such as flash memory and various ROM technologies), media accessible through an I/O interface in a computer, media accessible through a network interface in a computer, networked file servers from which at least some of the content can be accessed by another computer, data buffered, cached, or in transit through a computer network, or any other media that can be accessed by a computer.

What is claimed is:

1. A method of monitoring writes to a set of objects by one or more mutators, comprising:
    recording, by a write barrier executed by a mutator, information about at least one write by the mutator in a thread-local write barrier buffer associated with the mutator;
    obtaining the recorded information about writes from the thread-local write barrier buffers associated with one or more mutators;
    processing the recorded information about writes; and
    in response to the recorded information about one of the writes indicating that at least a part of an object being copied has been written into, causing at least the written part of the object to be re-copied to another copy of the object.

2. The method of claim 1, wherein obtaining recorded writes uses soft synchronization.

3. The method of claim 2, wherein:
    obtaining the recorded writes comprises saving one or more thread-local write barrier buffers associated with mutators to a data structure and causing each mutator thread to start using an empty thread-local write barrier buffer; and
    processing the recorded writes comprises iterating over writes in the saved write barrier buffers.

4. The method of claim 3, wherein the processing of the recorded writes is performed by a background thread.

5. The method of claim 2, wherein obtaining the recorded writes comprises, for at least one mutator thread, processing each write using the thread of the mutator in whose write barrier buffer it was stored.

6. The method of claim 1, wherein the information recorded for a write includes at least one piece of information selected from the group consisting of:
    the written memory address;
    the written object;
    an offset of the written field in the written object;
    an identifier for the written field in the written object; and
    the size of the write.

7. The method of claim 1, wherein the processing of a recorded write comprises at least one operation selected from the group consisting of:
    causing the written object to be re-copied;
    causing the written field of the written object to be re-copied;
    causing the copying of the written object to fail;
    causing the new value of the written field to be propagated to another copy of the written object; and
    causing the new value of the written field to be propagated to at least one node other than the node processing the write in a distributed system.

8. A computing system comprising:
    at least one mutator associated with a write barrier buffer;
    at least one write barrier connected to the mutator and comprising a write recorder configured to record information about at least one write by the mutator in the write barrier buffer;
    a write obtainer connected to at least one GC point handler connected to the mutator; and
    at least one write processor connected to the write obtainer, configured to process the recorded information about the at least one write and in response to the information indicating that at least a part of an object being copied has been written into, causing at least the written part of the object to be re-copied to another copy of the object.

9. The computing system of claim 8, wherein the write obtainer is connected to the at least one GC point handler using a soft synchronization mechanism.

10. The computing system of claim 8, wherein the write processor comprises at least one write handling component selected from the group consisting of:
    an object re-copier;
    a field re-copier;
    a copy aborter;
    a write propagator; and
    a distributed write propagator.

11. A tangible computer-readable medium comprising computer readable program code means embodied therein, operable to cause a computer to:
    record, using a write barrier executed by a mutator, information about at least one write by the mutator in a thread-local write barrier buffer associated with the mutator;
    obtain the recorded information about writes from the thread-local write barrier buffers associated with mutators;
    process the recorded information about writes; and
    in response to the recorded information about one of the writes indicating that at least a part of an object being copied has been written into, cause at least the written part of the object to be re-copied to another copy of the object.

12. The tangible computer-readable medium of claim 11, operable to cause the recorded writes to be obtained using soft synchronization.

13. The tangible computer-readable medium of claim 11, wherein the information caused to be recorded for a write includes at least one piece of information selected from the group consisting of:
the written memory address;
the written object;
an offset of the written field in the written object;
an identifier for the written field in the written object; and
the size of the write.

14. The tangible computer-readable medium of claim 11, wherein the processing of a recorded write comprises at least one operation selected from the group consisting of:
causing the written object to be re-copied;
causing the written field of the written object to be re-copied;
causing the copying of the written object to fail;
causing the new value of the written field to be propagated to another copy of the written object; and
causing the new value of the written field to be propagated to at least one node other than the node processing the write in a distributed system.

15. A method of monitoring writes to a set of objects by one or more mutators, comprising:
recording, by a write barrier executed by a mutator, information about at least one write by the mutator in a thread-local write barrier buffer associated with the mutator;
obtaining the recorded information about writes from the thread-local write barrier buffers associated with one or more mutators;
processing the recorded information about writes; and
in response to the recorded information about one of the writes indicating that at least a part of an object being copied has been written into, causing at least the written part of the object to be propagated to another node than the one processing the write in a distributed system.

16. A computing system comprising:
at least one mutator associated with a write barrier buffer;
at least one write barrier connected to the mutator and comprising a write recorder configured to record information about at least one write by the mutator in the write barrier buffer;
a write obtainer connected to at least one GC point handler connected to the mutator; and
at least one write processor connected to the write obtainer, configured to process the recorded information about the at least one write and in response to the information indicating that at least a part of an object being copied has been written into, causing at least the written part of the object to be propagated to another node than the one processing the write in a distributed system.

17. A tangible computer-readable medium comprising computer readable program code means embodied therein, operable to cause a computer to:
record, using a write barrier executed by a mutator, information about at least one write by the mutator in a thread-local write barrier buffer associated with the mutator;
obtain the recorded information about writes from the thread-local write barrier buffers associated with mutators;
process the recorded information about writes; and
in response to the recorded information about one of the writes indicating that at least a part of an object being copied has been written into, cause at least the written part of the object to be propagated to another node than the one processing the write in a distributed system.

* * * * *